(12) United States Patent
Fan

(10) Patent No.: US 11,199,766 B1
(45) Date of Patent: Dec. 14, 2021

(54) ILLUMINATION SYSTEM AND PROJECTION DEVICE

(71) Applicant: Coretronic Corporation, Hsin-Chu (TW)

(72) Inventor: Chen-Wei Fan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/216,698

(22) Filed: Mar. 30, 2021

(30) Foreign Application Priority Data

Jun. 15, 2020 (CN) .......................... 202010542621.8

(51) Int. Cl.
    *G03B 33/12* (2006.01)
    *G03B 21/20* (2006.01)
    *G02B 27/48* (2006.01)
    *G02B 27/28* (2006.01)

(52) U.S. Cl.
CPC ........... *G03B 33/12* (2013.01); *G02B 27/283* (2013.01); *G02B 27/48* (2013.01); *G03B 21/2013* (2013.01)

(58) Field of Classification Search
CPC .. G03B 33/12; G03B 33/2013; G02B 27/283; G02B 27/48
USPC ........................................................... 353/31
See application file for complete search history.

(56) References Cited

U.S. PATENT DOCUMENTS

2013/0329755 A1  12/2013  Arntsen et al.
2019/0219912 A1*  7/2019  Akiyama ............. G03B 21/208

FOREIGN PATENT DOCUMENTS

CN        101454716        6/2010
CN        209590519        11/2019

* cited by examiner

*Primary Examiner* — Jerry L Brooks
(74) *Attorney, Agent, or Firm* — JCIPRNET

(57) ABSTRACT

An illumination system and a projection device, including a light emitting module, a light uniforming element, and a beam splitting/combining module, are provided. The light emitting module includes red and blue light elements. The light uniforming element has an optical axis and a light entrance surface. The beam splitting/combining module is disposed on a transmission path of at least one blue light beam, is located between the light emitting module and the light uniforming element, and includes at least one beam splitting element and at least one reflective element. At least one among the red and the blue light beams is reflected by the reflective element and the beam splitting element. The red and blue light beams are transmitted to the light uniforming element in a direction parallel to the optical axis, and a speckle distribution on the light entrance surface is symmetrical with respect to the optical axis.

20 Claims, 13 Drawing Sheets

ILLUMINATION SYSTEM AND PROJECTION DEVICE

CROSS-REFERENCE TO RELATED APPLICATION

This application claims the priority benefit of Chinese application serial no. 202010542621.8, filed on Jun. 15, 2020. The entirety of the above-mentioned patent application is hereby incorporated by reference herein and made a part of this specification.

BACKGROUND

Technical Field

The disclosure relates to an optical system and a display device, and particularly to an illumination system and a projection device.

Description of Related Art

A projection device is a display device for generating images at a large size, which has been improving constantly with the evolution and innovation of science and technology. Imaging principles of projection devices include converting illumination light beams generated by illumination systems into image light beams through light valves, and then projecting the image light beams through projection lenses onto projection targets (e.g., a screen or a wall) to form projected images.

In addition, following the market's demands for brightness, color saturation, service life, freedom from toxics, environmental protection, etc., regarding the projection devices, illumination systems have also been evolving all the way from ultra-high-performance lamp (UHP lamp), light-emitting diode (LED), to the currently most advanced laser diode (LD) light source. However, in current optical path architectures, additional loops are necessary for blue light transmission paths, which causes difficulty in volume reduction of light combining systems. In addition, other color lights are mainly from excited lights generated through fluorescent powders excited by excitation light, and then filtered by filter wheels. Coordinates of other color lights are thus limited by types of fluorescent powders, and the efficiency is not high. Therefore, blue light which has higher energy is prone to the problems of excess and unevenness of energy.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides an illumination system and a projection device, in which light emitting elements can be integrated into the same one light emitting module. Meanwhile uniformity of a light beam transmitted to a light uniforming element can be enhanced.

Other objectives and advantages of the disclosure can be further understood from the technical features disclosed herein.

In order to achieve one, some, or all of the above or other objectives, the disclosure provides an illumination system including a light emitting module, a light uniforming element, and a beam splitting/combining module. The light emitting module includes a plurality of red light elements and a plurality of blue light elements. The plurality of red light elements are configured to provide a plurality of red light beams, and the plurality of blue light elements are configured to provide a plurality of blue light beams. The light uniforming element has an optical axis and a light entrance surface. The beam splitting/combining module is disposed on a transmission path of at least one of the plurality of blue light beams, and is located between the light emitting module and the light uniforming element. The beam splitting/combining module includes at least one beam splitting element and at least one reflective element. At least one light beam among the plurality of red light beams and the plurality of blue light beams is reflected by the at least one reflective element and the at least one beam splitting element. The plurality of red light beams and the plurality of blue light beams are transmitted to the light uniforming element in a direction parallel to the optical axis, and a speckle distribution on the light entrance surface is symmetrical with respect to the optical axis.

In order to achieve one, some, or all of the above or other objectives, the disclosure further provides a projection device including an illumination system, at least one light valve, and a projection lens. The illumination system is configured to provide an illumination light beam, and includes a light emitting module, a light uniforming element, and a beam splitting/combining module. The light emitting module includes a plurality of red light elements and a plurality of blue light elements. The plurality of red light elements are configured to provide a plurality of red light beams, and the plurality of blue light elements are configured to provide a plurality of blue light beams. The light uniforming element has an optical axis and a light entrance surface. The beam splitting/combining module is disposed on a transmission path of at least one of the plurality of blue light beams, and is located between the light emitting module and the light uniforming element. The at least one light valve is disposed on a transmission path of the illumination light beam, and is configured to convert the illumination light beam into an image light beam. The projection lens is disposed on a transmission path of the image light beam, and is configured to project the image light beam out of the projection device. The beam splitting/combining module includes at least one beam splitting element and at least one reflective element. At least one light beam among the plurality of red light beams and the plurality of blue light beams is reflected by the at least one reflective element and the at least one beam splitting element. The plurality of red light beams and the plurality of blue light beams are transmitted to the light uniforming element in a direction parallel to the optical axis, and a speckle distribution on the light entrance surface is symmetrical with respect to the optical axis.

Based on the foregoing, the embodiments of the disclosure have at least one of the following advantages or effects. In the illumination system and the projection device of the disclosure, via the beam splitting/combining function of the beam splitting/combining module, the speckle of the light beam emitted by the light emitting module formed on the light entrance surface of the light uniforming element can be symmetrical with respect to the optical axis of the light uniforming element. In this way, the light emitting elements can be integrally disposed in the same light emitting module, and meanwhile the uniformity of the light beam transmitted to the light uniforming element can be enhanced.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
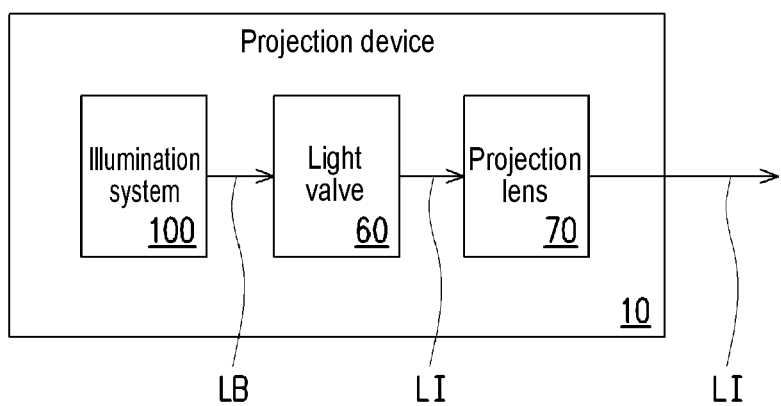
FIG. 1 is a schematic diagram of a projection device according to an embodiment of the disclosure.

FIG. 1 is a schematic diagram of a projection device according to an embodiment of the disclosure. Referring to FIG. 1, this embodiment provides a projection device 10, which includes an illumination system 100, at least one light valve 60, and a projection lens 70. Herein, the illumination system 100 is configured to provide an illumination light beam LB. The at least one light valve 60 is disposed on a transmission path of the illumination light beam LB to convert the illumination light beam LB into an image light beam LI. The projection lens 70 is disposed on a transmission path of the image light beam LI, and is configured to project the image light beam LI out of the projection device 10 to a projection target (not shown), such as a screen or a wall.

In this embodiment, the light valve 60 may be a reflective light modulator, such as a liquid crystal on silicon panel (LCoS panel), a digital micro-mirror device (DMD), or the like. In some embodiments, the light valve 60 may as well be a transmissive light modulator, such as a transparent liquid crystal panel, an electro-optical modulator, a magneto-optic modulator, an acousto-optic modulator (AOM), or the like. The disclosure does not limit the forms and types of the light valve 60. Regarding methods for converting the illumination light beam LB into the image light beam LI by the light valve 60, detailed steps and implementations will not be repeatedly described herein, as sufficient teachings, suggestions, and implementation instructions can be obtained from general common knowledge in the art. In this embodiment, the number of the light valves 60 is one, such as a single digital micro-mirror device used in the projection device 10. However, in other embodiments, the number may be plural. The disclosure is not limited thereto.

The projection lens 70 may include, for example, a combination of one or more optical lenses having diopters, such as various combinations of non-planar lenses including biconcave lenses, biconvex lenses, concave-convex lenses, convex-concave lenses, plano-convex lenses, and planoconcave lenses. In an embodiment, the projection lens 70 may further include a planar optical lens, which projects the image light beam LI from the light valve 60 to the projection target by a manner of reflection. The disclosure does not limit the forms and types of the projection lens 70.

Figure 2:
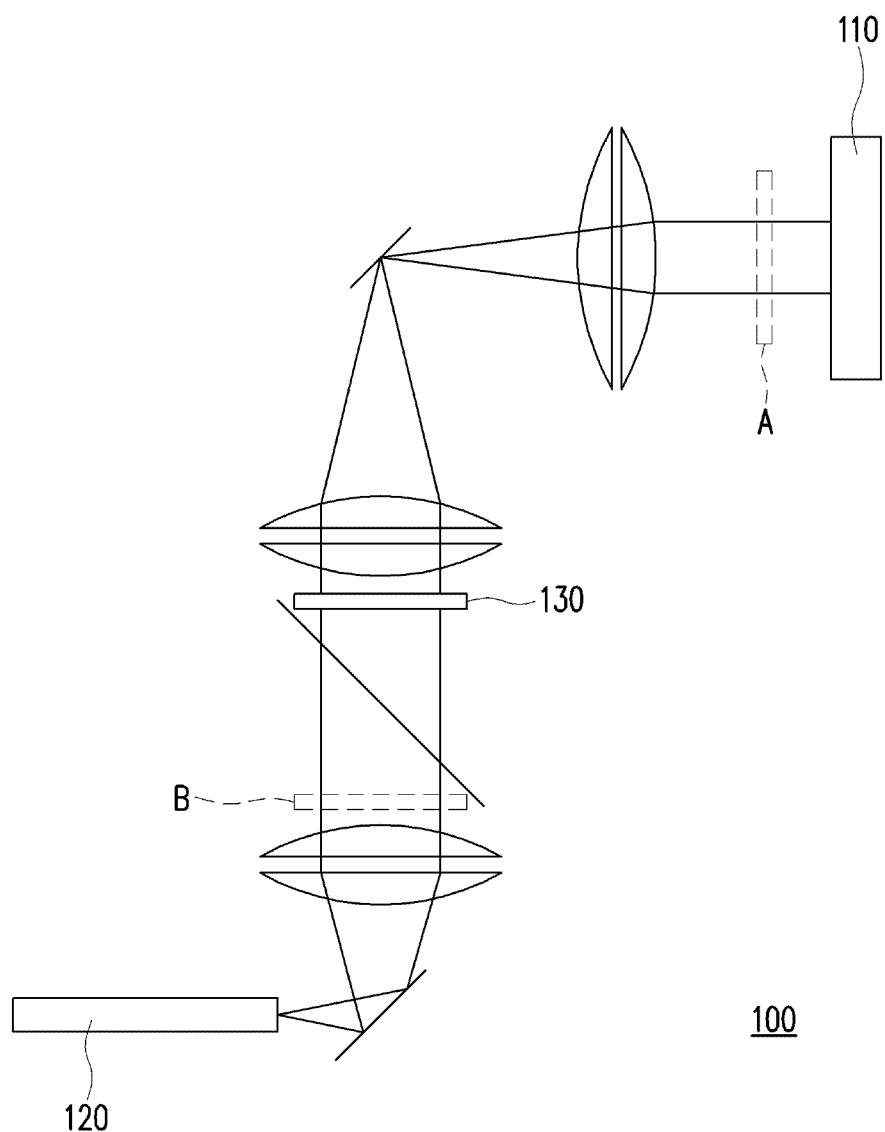
FIG. 2 is a partial schematic diagram of the illumination system according to an embodiment of the disclosure.

FIG. 2 is a partial schematic diagram of the illumination system according to an embodiment of the disclosure. Referring to FIG. 2, the illumination system 100 includes a light emitting module 110, a light uniforming element 120, and a beam splitting/combining module 130. Herein, the beam splitting/combining module 130 is located between the light emitting module 110 and the light uniforming element 120. Specifically, the beam splitting/combining module 130 is disposed on a transmission path of a light beam emitted by the light emitting module 110, or on a transmission path of a light beam converted from the light beam; that is, the beam splitting/combining module 130 may be disposed at a location as shown in FIG. 2, or between positions A and B. However, the disclosure is not limited thereto. In this embodiment, the illumination system 100 may further include other optical elements, such as wavelength conversion devices, filter devices, mirrors, or optical lenses, for guiding the light beam to the light uniforming element 120. However, the disclosure does not limit the types or forms of the optical elements in the illumination system 100. Detailed structures and implementations thereof will not be repeatedly described herein, as sufficient teachings, suggestions, and implementation instructions can be obtained from general common knowledge in the art.

Figure 3:
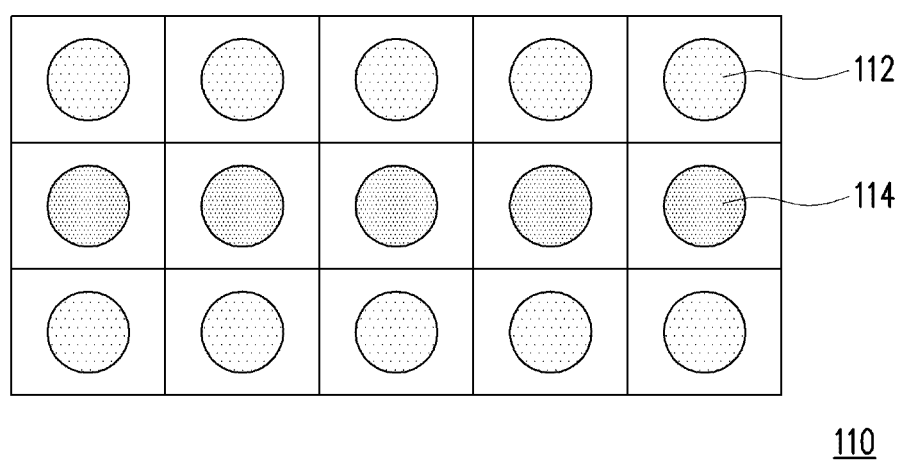
FIG. 3 is a schematic diagram of the light emitting module of the illumination system shown in FIG. 2.
Figure 4:
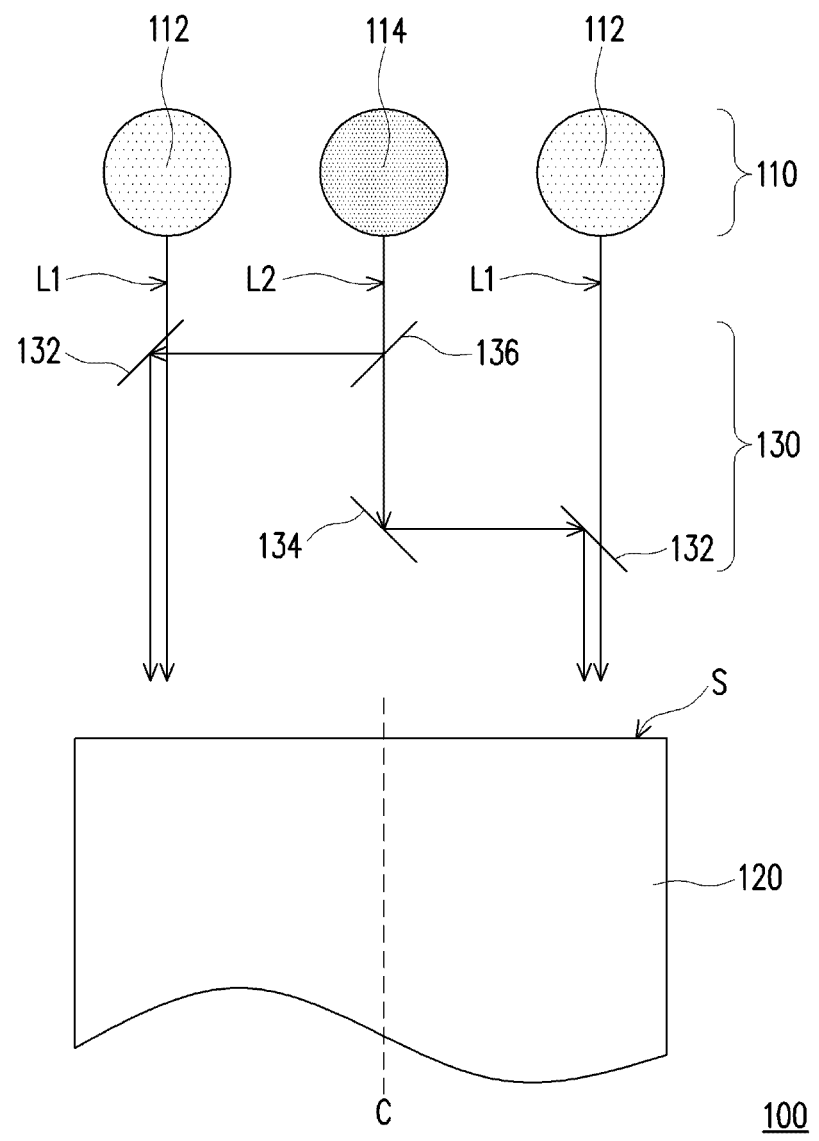
FIG. 4 is a schematic diagram of light path transmission of the light emitting module shown in FIG. 3.

FIG. 3 is a schematic diagram of the light emitting module of the illumination system shown in FIG. 2. FIG. 4 is a schematic diagram of light path transmission of the light emitting module shown in FIG. 3. Referring to FIG. 2 to FIG. 4 at the same time, the light emitting module 110 includes a plurality of red light elements 112 and a plurality of blue light elements 114. The plurality of red light elements 112 are configured to provide a plurality of red light beams L1, and the plurality of blue light elements 114 are configured to provide a plurality of blue light beams L2. In this embodiment, the number of the red light elements 112 is greater than or equal to the number of the blue light elements 114. For example, in this embodiment, the light emitting module 110 may be a multi-chip laser (MCL), the red light elements 112 may be red LDs disposed in the MCL, and the blue light element 114 may be blue LDs disposed in the MCL. In this embodiment, the red light elements 112 are arranged in two rows, and the blue light elements 114 are arranged in a single row between the red light elements 112, as shown in FIG. 3. However, the disclosure is not limited thereto.

The light uniforming element 120 is disposed on transmission paths of the red light beams L1 and the blue light beams L2, and is configured to modulate the red light beam L1 and the blue light beam L2 as the illumination light beam LB, but the disclosure is not limited thereto. In another embodiment, the illumination light beam LB may further include a converted light beam or other color lights. The light uniforming element 120 is configured to adjust the speckle shape of the illumination light beam LB, so that the speckle shape thereof can match the shape (e.g., rectangular) of a working area of the light valve 60. Thereby, the speckles have a consistent or close light intensity to achieve uniformity of light intensity of the illumination light beam LB. In this embodiment, the light uniforming element 120 is, for example, an integration rod, but in other embodiments, the light uniforming element 120 may as well be other appropriate types of optical elements, such as a lens array (a fly eye lens array), but the disclosure is not limited thereto. In this embodiment, the light uniforming element 120 has an optical axis C and a light entrance surface S (as shown in FIG. 4), and the red light beams L1 and the blue light beams L2 are transmitted to the light uniforming element 120 in a direction parallel to the optical axis C. In this embodiment, a speckle distribution of the red light beams L1 and the blue light beams L2 on the light entrance surface S of the light uniforming element 120 is symmetrical with respect to the optical axis C of the light uniforming element 120.

Referring to FIG. 4, the beam splitting/combining module 130 is disposed on the transmission path of at least one of the blue light beams L2. The beam splitting/combining module 130 includes at least one beam splitting element 132 and at least one reflective element 134. In addition, at least one light beam among the plurality of red light beams L1 and the plurality of blue light beams L2 is reflected by the at least one reflective element 134 and the at least one beam splitting element 132. In detail, in this embodiment, the beam splitting/combining module 130 is located on transmission paths on which the red light beams L1 and the blue light beams L2 are transmitted in a collimated manner in the illumination system 100. The beam splitting/combining module 130 includes two beam splitting elements 132 and a reflective element 134. The beam splitting/combining module 130 further includes a semi-reflective element 136 which is disposed on the transmission path of the blue light beam L2, by which 50% of the blue light beam L2 is reflected to one of the beam splitting elements 132, and 50% of the blue light beam L2 is allowed to pass and transmitted to the reflective element 134. Then, the blue light beam L2 transmitted to the reflective element 134 is reflected by the reflective element 134, and is transmitted to the other beam splitting element 132, as shown in FIG. 4. The beam splitting element 132 is, for example, a blue light reflective beam splitting lens configured to reflect the blue light beam L2 and allow the red light beam L1 to pass. In another embodiment, the beam splitting/combining module 130 is disposed on a transmission path of the converted light beam and allows the converted light beam to penetrate.

Therefore, the blue light beam L2 at the center can be combined with the red light beam L1 through a beam splitting/combining function of the beam splitting/combining module 130. Thereby, a speckle of the blue light beam L2 formed on the light entrance surface S of the light uniforming element 120 is symmetrical with respect to the optical axis C of the light uniforming element 120, and the speckle of the blue light beam L2 formed on the light entrance surface S of the light uniforming element 120 overlaps with a speckle of the red light beam L1. In this way, the light emitting elements can be integrally disposed in the same light emitting module 110, and meanwhile the uniformity of the light beam transmitted to the light uniforming element 120 can be enhanced.

Figure 5:
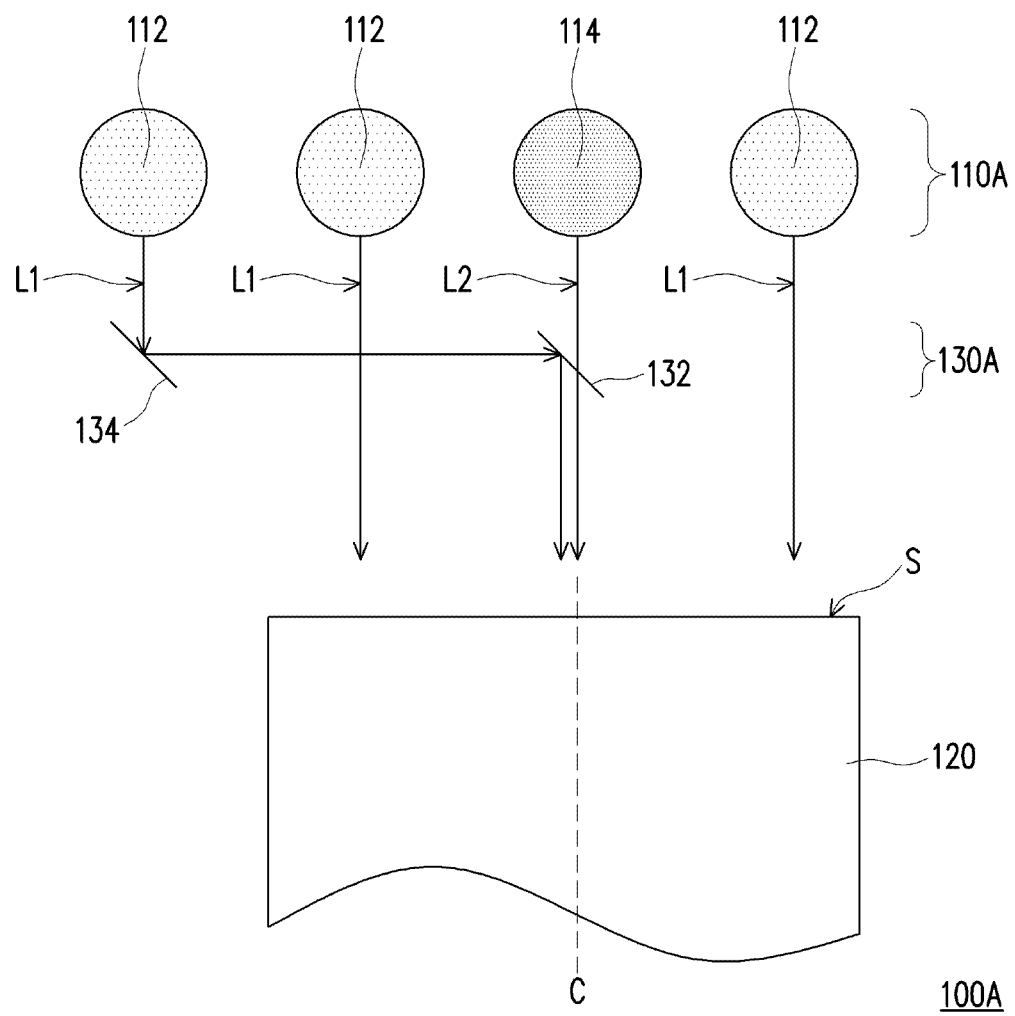
FIG. 5 is a schematic diagram of light path transmission of a light emitting module according to another embodiment of the disclosure.

FIG. 5 is a schematic diagram of light path transmission of a light emitting module according to another embodiment of the disclosure. Referring to FIG. 5, an illumination system 100A in this embodiment is similar to the illumination system 100 shown in FIG. 4. The difference between the two is that, in this embodiment, a light emitting module 110A of the illumination system 100A includes three rows of red light elements 112, and the blue light elements 114 are arranged in a single row between two adjacent rows of red light elements 112. The beam splitting element 132 of a beam splitting/combining module 130A is disposed on the transmission path of the blue light beam L2, by which the blue light beam L2 is allowed to pass and the red light beam L1 is reflected. The beam splitting element 132 is, for example, a red light reflective beam splitting lens. The reflective element 134 is disposed on the transmission path of the red light beam L1 which is farthest from the blue light beam L2, by which the red light beam L1 is reflected to the beam splitting element 132. Therefore, the red light beam L1 on the outermost side can be combined with the blue light beam L2 via a beam splitting/combining function of the beam splitting/combining module 130A, and the speckle formed on the light entrance surface S of the light uniforming element 120 can be symmetrical with respect to the optical axis C of light uniforming element 120. In this way, the light emitting elements can be integrally disposed in the same light emitting module 110A, and meanwhile the uniformity of the light beam transmitted to the light uniforming element 120 can be enhanced.

Figure 6:
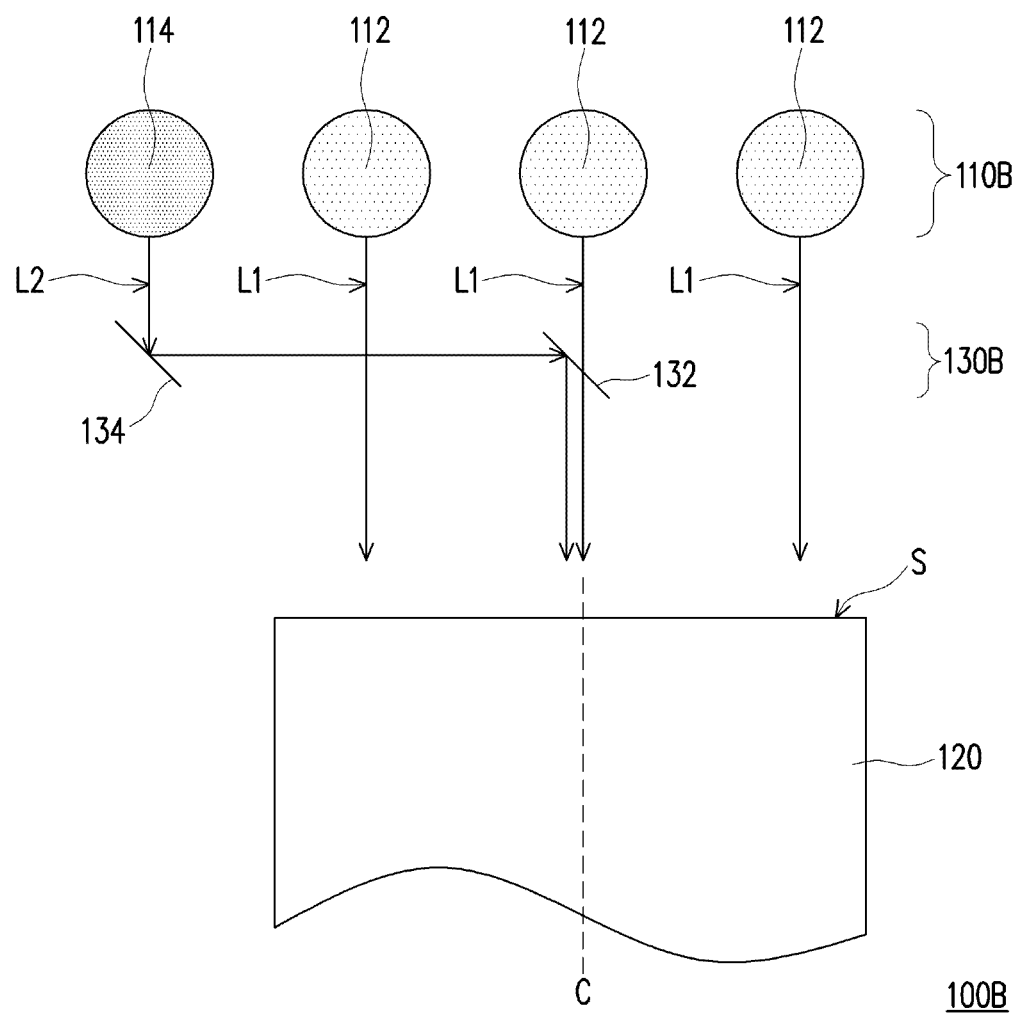
FIG. 6 is a schematic diagram of light path transmission of a light emitting module according to another embodiment of the disclosure.

FIG. 6 is a schematic diagram of light path transmission of a light emitting module according to another embodiment of the disclosure. Referring to FIG. 6, an illumination system 100B in this embodiment is similar to the illumination system 100 shown in FIG. 4. The difference between the two is that, in this embodiment, a light emitting module 110B of the illumination system 100B includes three rows of red light elements 112, and the blue light elements 114 are arranged in a single row on one side of the three rows of red light elements 112. The beam splitting element 132 of a beam splitting/combining module 130B is disposed on the transmission path of the red light beam L1 located at the center, by which the red light beam L1 is allowed to pass and the blue light beam L2 is reflected. The beam splitting element 132 is, for example, a blue light reflective beam splitting lens. The reflective element 134 is disposed on the transmission path of the blue light beam L2, by which the blue light beam L2 is reflected to the beam splitting element 132. Therefore, via a beam splitting/combining function of the beam splitting/combining module 130B, the speckle of the blue light beam L2 on the outer side formed on the light entrance surface S of the light uniforming element 120 can be symmetrical with respect to the optical axis of the light uniforming element 120. In this way, the light emitting elements can be integrally disposed in the same light emitting module 110B, and meanwhile the uniformity of the light beam transmitted to the light uniforming element 120 can be enhanced.

Figure 7:
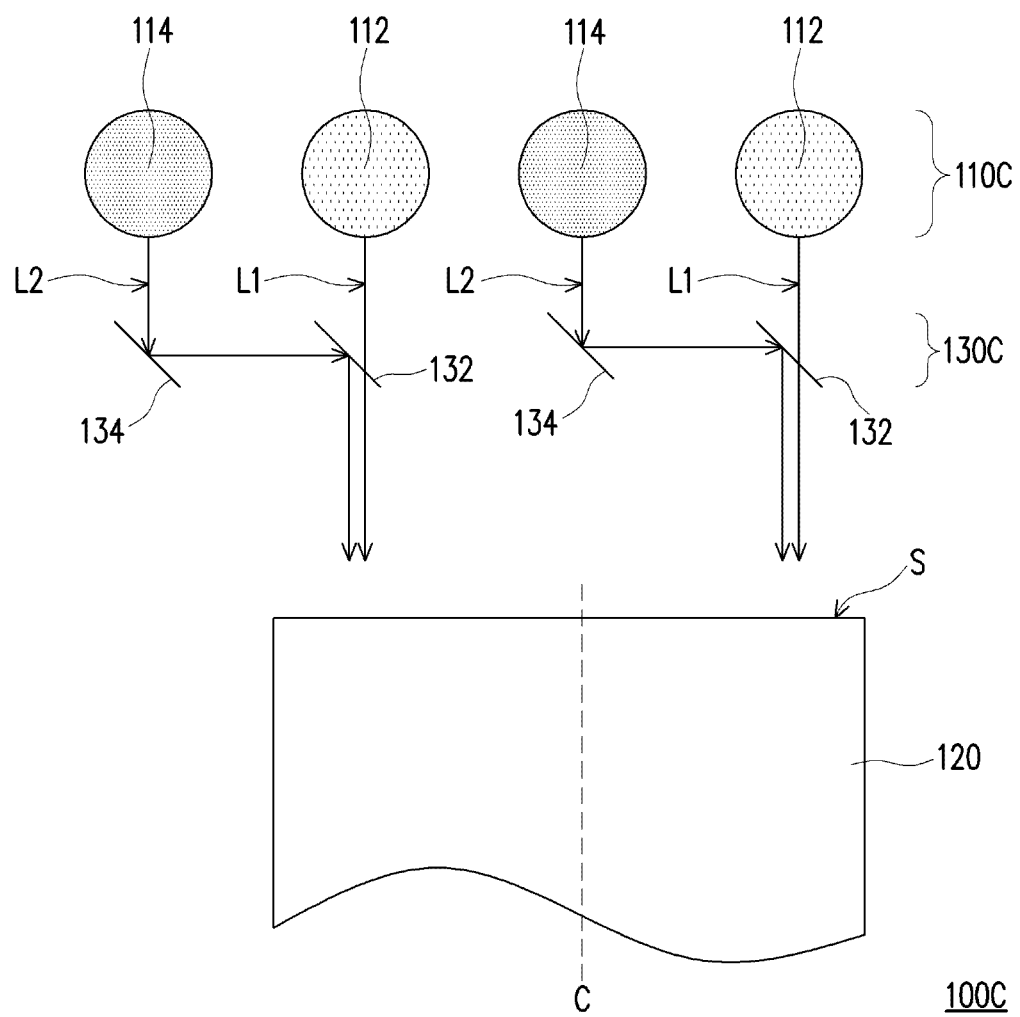
FIG. 7 is a schematic diagram of light path transmission of a light emitting module according to another embodiment of the disclosure.

FIG. 7 is a schematic diagram of light path transmission of a light emitting module according to another embodiment of the disclosure. Referring to FIG. 7, an illumination system 100C in this embodiment is similar to the illumination system 100 shown in FIG. 4. The difference between the two is that, in this embodiment, a light emitting module 110C of the illumination system 100C includes two rows of red light elements 112 and two rows of blue light elements 114 which are arranged in a staggered manner. The number of the reflective element 134 and the number of the beam splitting element 132 are equal and both are at least one. Specifically, in this embodiment, a beam splitting/combining module 130C includes two beam splitting elements 132 and two reflective elements 134. The beam splitting elements 132 are disposed on the transmission paths of the red light beams L1, by which the red light beams L1 is allowed to pass and the blue light beams L2 is reflected. The beam splitting elements 132 are, for example, blue light reflective beam splitting lenses. The reflective elements 134 are arranged on the transmission paths of the blue light beams L2, by which the blue light beams L2 is reflected to the beam splitting element 132 which is closer. Therefore, via a beam splitting/combining function of the beam splitting/combining module 130C, the speckles of the red light beams L1 and the blue light beams L2 formed on the light entrance surface S of the light uniforming element 120 can be symmetrical with respect to the optical axis C of the light uniforming element 120. In this way, the light emitting elements can be integrally disposed in the same light emitting module 110C, and meanwhile the uniformity of the light beam transmitted to the light uniforming element 120 can be enhanced.

Figure 8:
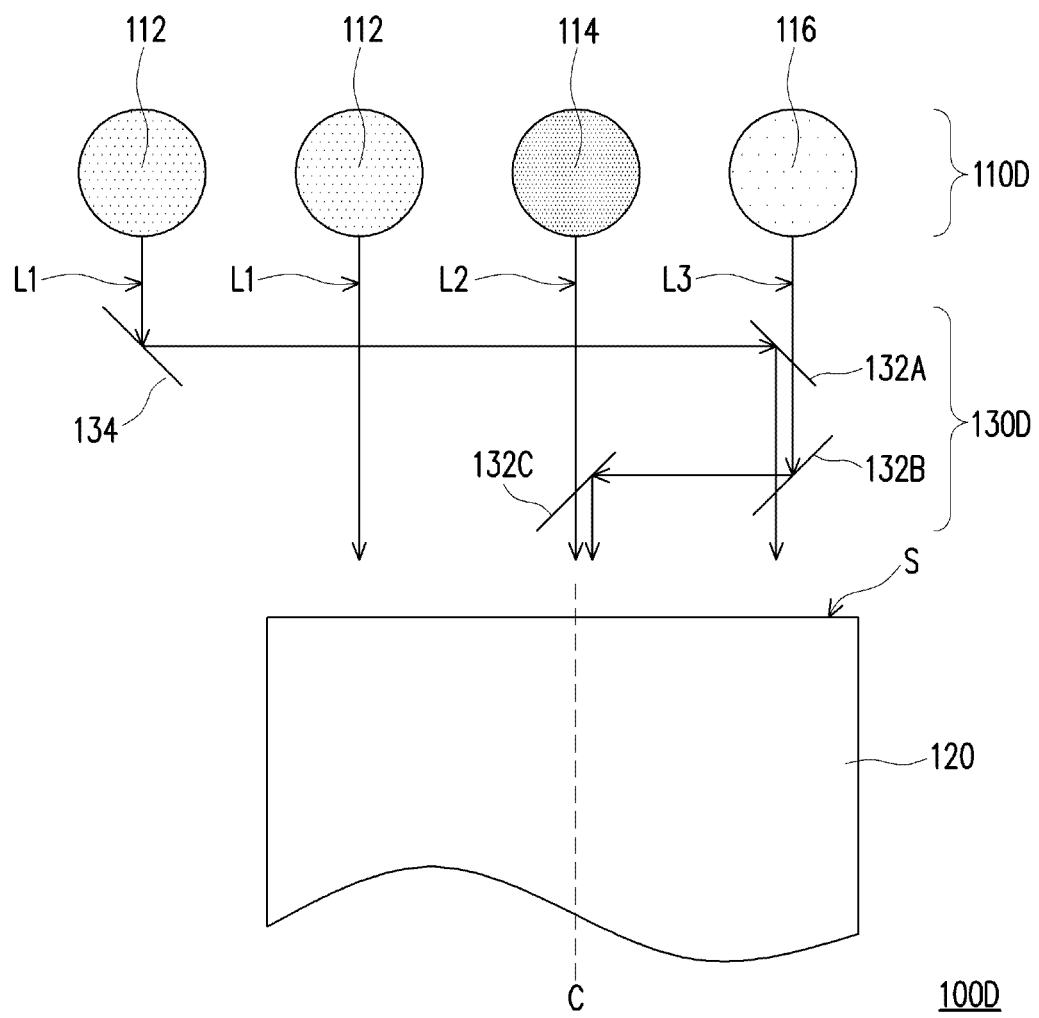
FIG. 8 is a schematic diagram of light path transmission of a light emitting module according to another embodiment of the disclosure.

FIG. 8 is a schematic diagram of light path transmission of a light emitting module according to another embodiment of the disclosure. Referring to FIG. 8, an illumination system 100D in this embodiment is similar to the illumination system 100 shown in FIG. 4. The difference between the two is that, in this embodiment, a light emitting module 110D further includes a plurality of green light elements 116 configured to provide a plurality of green light beams L3. The plurality of green light beams L3 are transmitted to the light uniforming element 120 in a direction parallel to the optical axis C, and a speckle thereof on the light entrance surface S is symmetrical with respect to the optical axis C. In detail, the light emitting module 110D of the illumination system 100D includes two rows of red light elements 112, one row of blue light elements 114, and one row of green light elements 116. Moreover, the blue light elements 114 are disposed between the red light elements 112 and the green light elements 116. A beam splitting/combining module 130D includes three beam splitting elements 132A, 132B, and 132C, and the reflective element 134. The beam splitting element 132A is disposed on a transmission path of the green light beam L3, by which the green light beam L3 is allowed to pass and the red light beam L1 is reflected. The beam splitting element 132A is, for example, a red light reflective beam splitting lens. The beam splitting element 132B is disposed on the transmission path of the green light beam L3, by which the green light beam L3 is reflected and the red light beam L1 is allowed to pass. The beam splitting element 132C is disposed on the transmission path of the blue light beam L2, by which the blue light beam L2 is allowed to pass and the green light beam L3 is reflected. The beam splitting elements 132B and 132C are, for example, green light reflective beam splitting lenses. The reflective element 134 is disposed on the transmission path of the red light beam L1, by which the red light beam L1 is reflected to the beam splitting element 132A. Therefore, via a beam splitting/combining function of the beam splitting/combining module 130D, the speckle of the red light beam LI formed on the light entrance surface S of the light uniforming element 120 can be symmetrical with respect to the optical axis C of the light uniforming element 120. In this way, the light emitting elements can be integrally disposed in the same light emitting module 110D, and meanwhile the uniformity of the light beam transmitted to the light uniforming element 120 can be enhanced.

Figure 9:
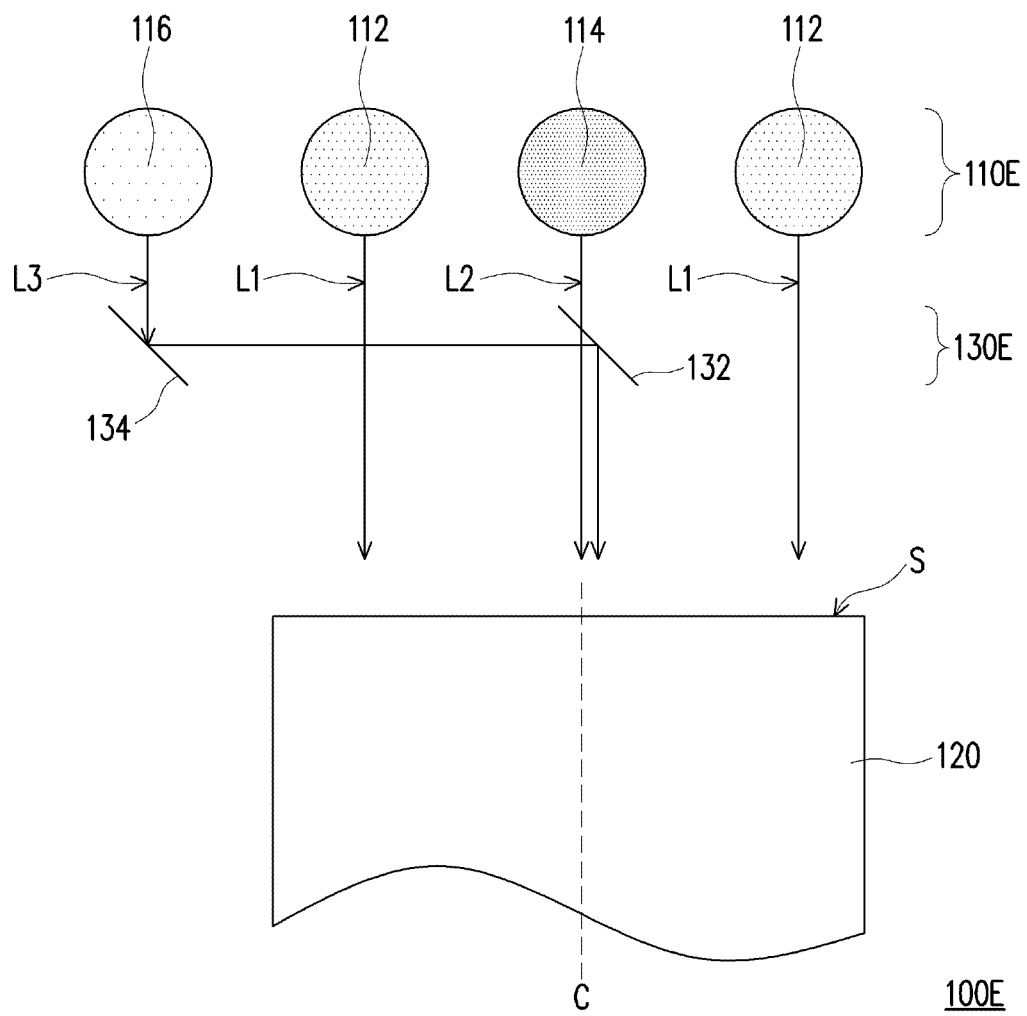
FIG. 9 is a schematic diagram of light path transmission of a light emitting module according to another embodiment of the disclosure.

FIG. 9 is a schematic diagram of light path transmission of a light emitting module according to another embodiment of the disclosure. Referring to FIG. 9, an illumination system 100E of this embodiment is similar to the illumination system 100D shown in FIG. 8. The difference between the two is that, in this embodiment, the blue light element 114 of a light emitting module 110E is arranged between two adjacent rows of red light elements 112, and the green light element 116 is arranged on one side of the two rows of red light elements 112. The beam splitting element 132 of the beam splitting/combining module 130E is disposed on the transmission path of the blue light beam L2, by which the blue light beam L2 is allowed to pass and the green light beam L3 is reflected. The beam splitting element 132 is, for example, a green light reflective beam splitting lens. The reflective element 134 is disposed on the transmission path of the green light beam L3, by which the green light beam L3 is reflected to the beam splitting element 132. Therefore, via a beam splitting/combining function of the beam splitting/combining module 130E, the speckle of the green light beam L3 formed on the light entrance surface S of the light uniforming element 120 can be symmetrical with respect to the optical axis C of the light uniforming element 120. In this way, the light emitting elements can be integrally disposed in the same light emitting module 110E, and meanwhile the uniformity of the light beam transmitted to the light uniforming element 120 can be enhanced.

Figure 10:
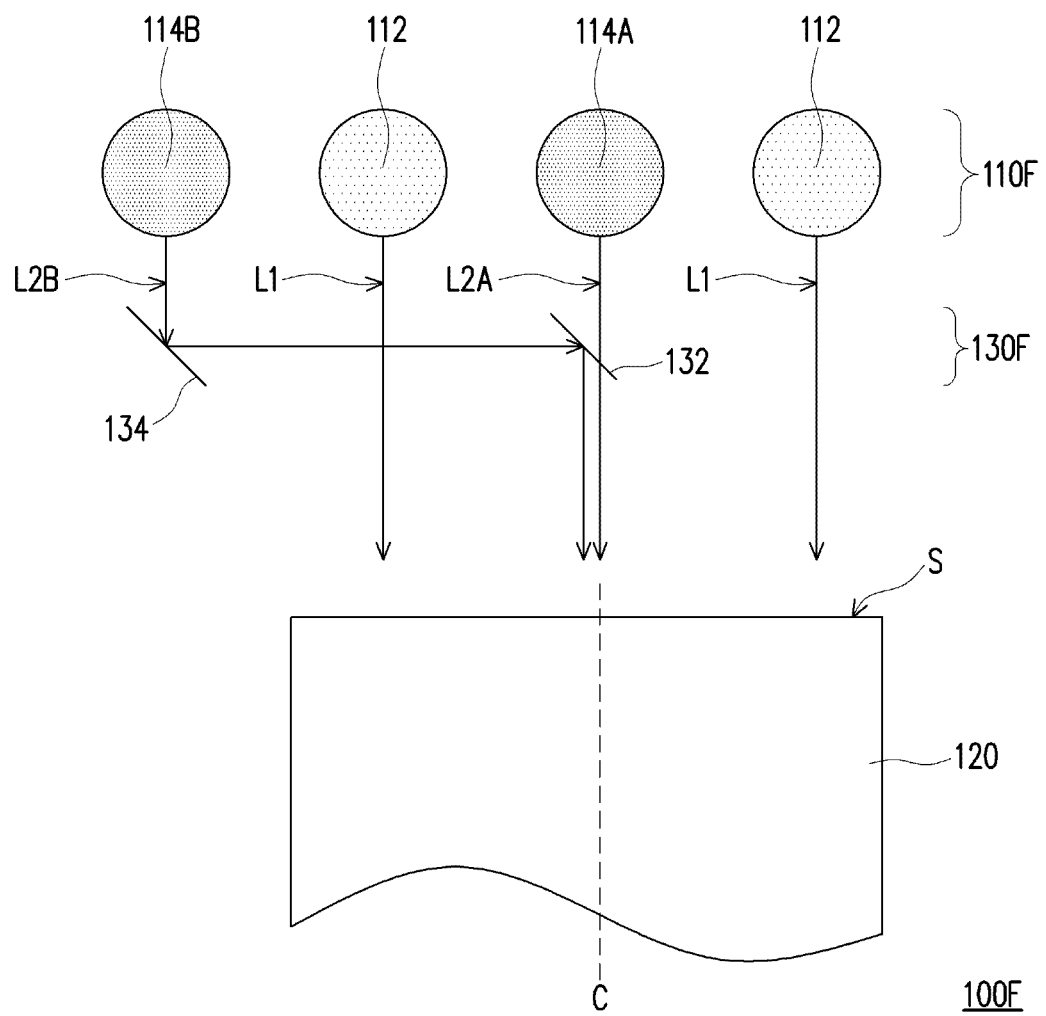
FIG. 10 is a schematic diagram of light path transmission of a light emitting module according to another embodiment of the disclosure.

FIG. 10 is a schematic diagram of light path transmission of a light emitting module according to another embodiment of the disclosure. Referring to FIG. 10, notably, in the foregoing embodiments shown in FIG. 4 to FIG. 9, the red light elements and the blue light elements in the light emitting modules may have different polarization states, and the beam splitting elements may adopt a polarization beam splitter for the beam splitting functions, but the disclosure is not limited thereto. In some embodiments, different polarization states may be selected for the plurality of light emitting elements at the same wavelength in the light emitting modules. For example, an illumination system 100F in this embodiment is similar to the illumination system 100C shown in FIG. 7, in which a light emitting module 110F in this embodiment is similar to the light emitting module 110C shown in FIG. 7. The difference between the two is that, in this embodiment, the light emitting module 110F of the illumination system 100F includes two rows of red light elements 112, a first blue light element 114A, and a second blue light element 114B. Herein, a polarization state of a first blue light beam L2A emitted by the first blue light element 114A is different from another polarization state of a second blue light beam L2B emitted by the second blue light element 114B. The beam splitting/combining module 130F includes the beam splitting element 132 and the reflective element 134. The beam splitting element 132 is disposed on a transmission path of the first blue light beam L2A, by which the first blue light beam L2A is allowed to pass and the second blue light beam L2B in the another polarization state is reflected. The beam splitting element 132 is, for example, a blue light polarization beam splitter. The reflective element 134 is disposed on a transmission path of the second blue light beam L2B, by which the second blue light beam L2B is reflected to the beam splitting element 132. Therefore, via a beam splitting/ combining function of the beam splitting/combining module 130F, speckles of the first light beam L2A and the second blue light beam L2B formed on the light entrance surface S of the light uniforming element 120 can be symmetrical with respect to the optical axis C of the light uniforming element 120. In this way, the light emitting elements can be integrally disposed in the same light emitting module 110F, and meanwhile the uniformity of the light beam transmitted to the light uniforming element 120 can be enhanced.

Figure 11:
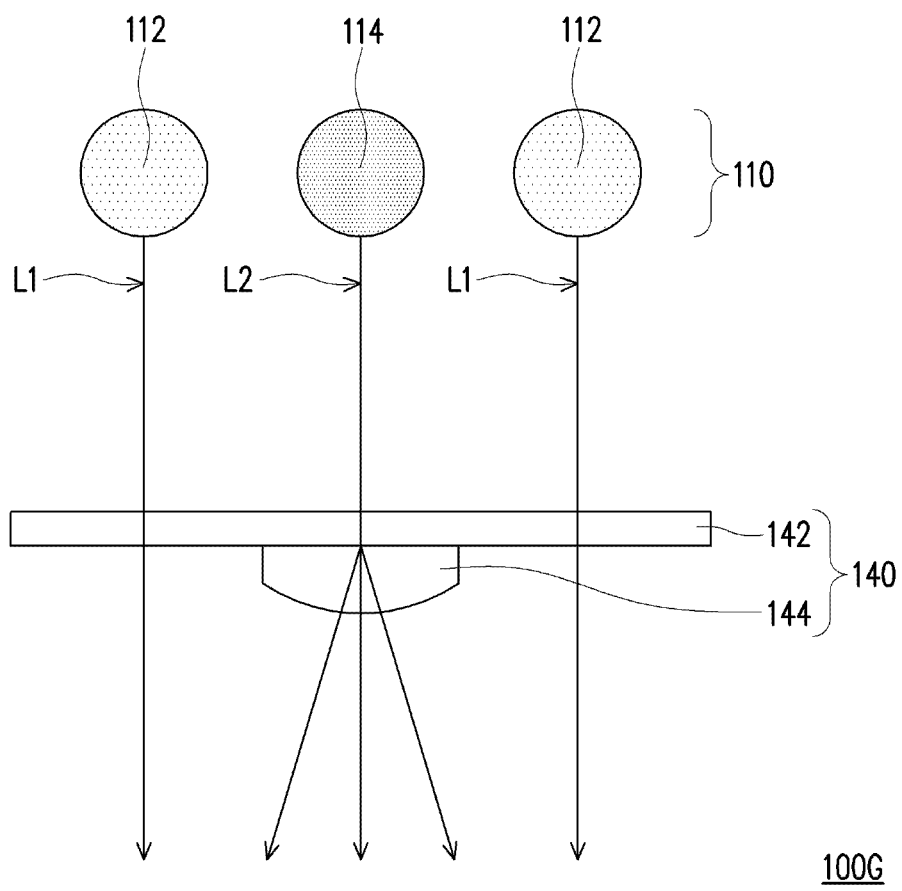
FIG. 11 is a schematic diagram of light path transmission of a light emitting module according to another embodiment of the disclosure.

FIG. 11 is a schematic diagram of light path transmission of a light emitting module according to another embodiment of the disclosure. Referring to FIG. 11, an illumination system 100G in this embodiment is similar to the illumination system 100 shown in FIG. 4. The difference between the two is that, in this embodiment, the illumination system 100G further includes a speckle expanding element 140 arranged on the transmission path of the blue light beam L2 and configured to increase the divergence angle of the blue light beam L2. Specifically, the speckle expanding element 140 is disposed between the light emitting module 110 and the beam splitting/combining module (not shown). In this embodiment, the speckle expanding element 140 has a non-speckle expanding part 142 and a speckle expanding part 144. Herein, the non-speckle expanding part 142 is disposed on the transmission paths of all the light beams, and the speckle expanding part 144 is only disposed on the transmission path of the blue light beam L2. Therefore, the blue light beam L2 can generate a divergence effect through the speckle expanding part 144, thereby enhancing the uniformity of the blue light beam L2 transmitted to the light uniforming element (not shown). The speckle expanding element 140 is, for example, a lenticular lens, a prism, or a micro lens array, but the disclosure is not limited thereto.

Figure 12:
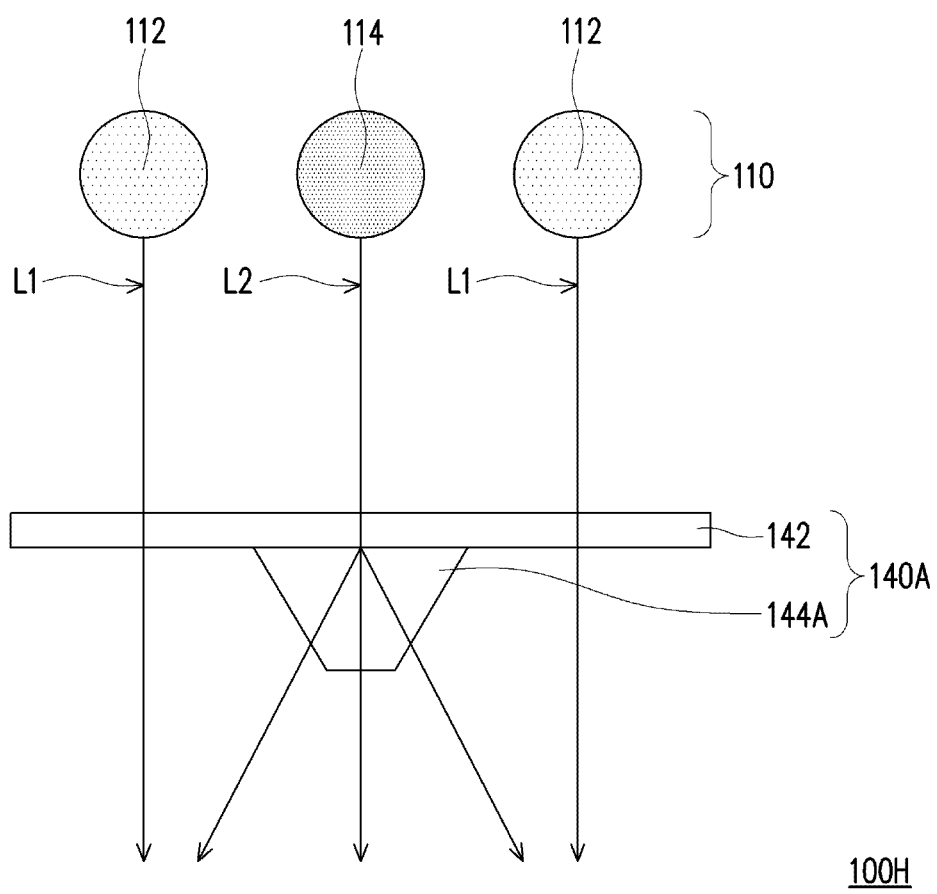
FIG. 12 is a schematic diagram of light path transmission of a light emitting module according to another embodiment of the disclosure.

FIG. 12 is a schematic diagram of light path transmission of a light emitting module according to another embodiment of the disclosure. Referring to FIG. 12, an illumination system 100H in this embodiment is similar to the illumination system 100G shown in FIG. 11. The difference between the two is that, in this embodiment, a speckle expanding part 144A of a speckle expanding element 140A of the illumination system 100H is a wedge prism. Therefore, the blue light beam L2 can generate a deflection effect through the speckle expanding part 144A, thereby enhancing the uniformity of the blue light beam L2 transmitted to the light uniforming element (not shown).

Figure 13:
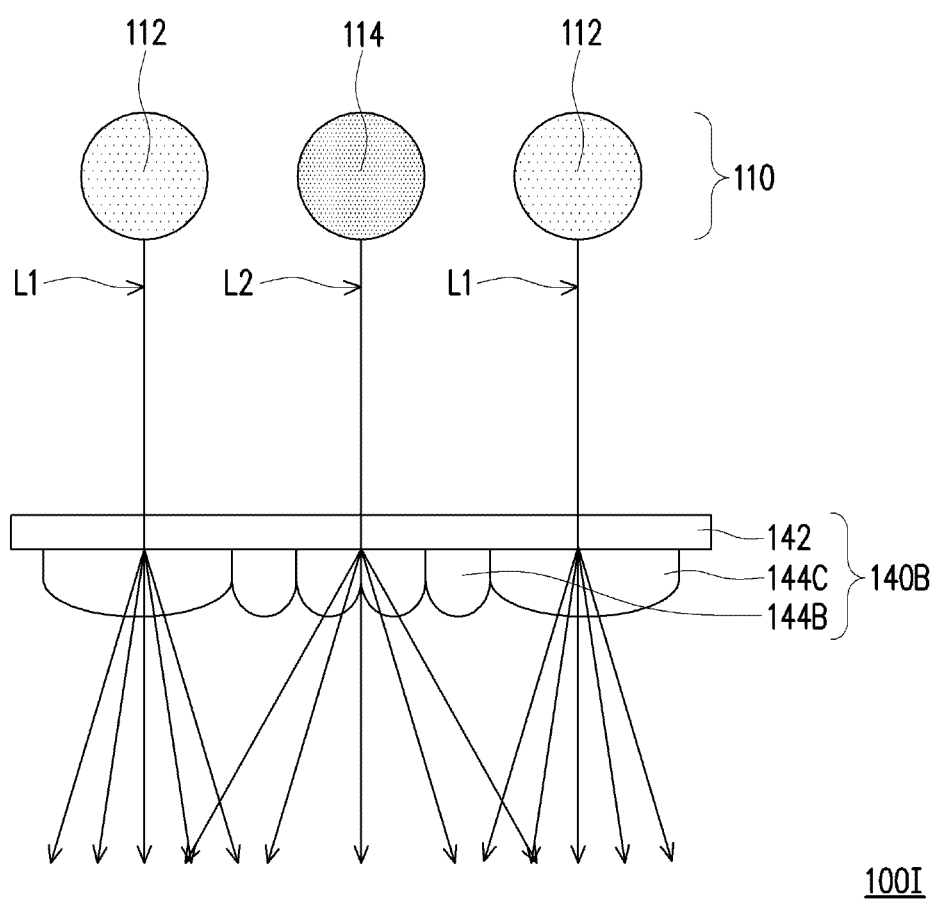
FIG. 13 is a schematic diagram of light path transmission of a light emitting module according to another embodiment of the disclosure.

FIG. 13 is a schematic diagram of light path transmission of a light emitting module according to another embodiment of the disclosure. Referring to FIG. 13, an illumination system 100I in this embodiment is similar to the illumination system 100G shown in FIG. 11. The difference between the two is that, in this embodiment, a speckle expanding element 140B of the illumination system 100I includes the non-speckle expanding part 142, a first speckle expanding part 144B, and a second speckle expanding part 144C. Herein, the divergence angle of the first speckle expanding part 144B is greater than that of the second speckle expanding part 144C. In this embodiment, the first speckle expanding part 144B is located on the transmission path of the blue light beam L2, and the second speckle expanding part 144C is located on the transmission path of the red light beam L1. Therefore, both the red light beam L1 and the blue light beam L2 can generate a divergence effect through the speckle expanding element 140B. In addition, the uniformity of the blue light beam L2 is better enhanced compared with the red light beam L1, thereby enhancing the uniformity of the red light beam L1 and the blue light beam L2 transmitted to the light uniforming element (not shown).

In summary of the foregoing, the embodiments of the disclosure have at least one of the following advantages or effects. In the illumination system and the projection device of the disclosure, via the beam splitting/combining function of the beam splitting/combining module, the speckle of the light beam emitted by the light emitting module formed on the light entrance surface of the light uniforming element can be symmetrical with respect to the optical axis of the light uniforming element. In this way, the light emitting elements can be integrally disposed in the same light emitting module, and meanwhile the uniformity of the light beam transmitted to the light uniforming element can be enhanced. In addition, the illumination system of the disclosure further includes the speckle expanding element disposed on the transmission path of the blue light beam and configured to increase the divergence angle of the blue light beam, thereby enhancing the uniformity of the blue light beam transmitted to the light uniforming element. The speckle expanding element is disposed between the light emitting module and the beam splitting/combining module.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system comprising a light emitting module, a light uniforming element, and a beam splitting/combining module, wherein:
   the light emitting module comprises a plurality of red light elements and a plurality of blue light elements, wherein the plurality of red light elements are configured to provide a plurality of red light beams, and the plurality of blue light elements are configured to provide a plurality of blue light beams;
   the light uniforming element has an optical axis and a light entrance surface; and
   the beam splitting/combining module is disposed on a transmission path of at least one of the plurality of blue light beams, and is located between the light emitting module and the light uniforming element, wherein the beam splitting/combining module comprises at least one beam splitting element and at least one reflective element, at least one light beam among the plurality of red light beams and the plurality of blue light beams is reflected by the at least one reflective element and the at least one beam splitting element, the plurality of red light beams and the plurality of blue light beams are transmitted to the light uniforming element in a direction parallel to the optical axis, and a speckle distribution on the light entrance surface is symmetrical with respect to the optical axis.

2. The illumination system according to claim 1, wherein the beam splitting/combining module is located on transmission paths on which the plurality of red light beams and the plurality of blue light beams are transmitted in a collimated manner in the illumination system.

3. The illumination system according to claim 1, wherein after the plurality of blue light beams are transmitted through the beam splitting/combining module, a speckle of the plurality of blue light beams overlaps with a speckle of at least a part of the plurality of red light beams.

4. The illumination system according to claim 1, wherein the beam splitting/combining module further comprises a semi-reflective element, the at least one reflective element is one reflective element, the at least one beam splitting element is two beam splitting elements both configured to reflect blue light and allow red light to pass, a part of the plurality of blue light beams are reflected by the semi-reflective element and one of the beam splitting elements, and another part of the plurality of blue light beams pass through the semi-reflective element and are reflected by the reflective element and another one of the beam splitting elements.

5. The illumination system according to claim 1, wherein a number of the plurality of red light elements is greater than or equal to a number of the plurality of blue light elements.

6. The illumination system according to claim 1, wherein a number of the at least one reflective element and a number of the at least one beam splitting element are equal and both are at least one.

7. The illumination system according to claim 1, wherein the light emitting module further comprises a plurality of green light elements configured to provide a plurality of green light beams, the plurality of green light beams are transmitted to the light uniforming element in a direction parallel to the optical axis, and a speckle distribution on the light entrance surface is symmetrical with respect to the optical axis.

8. The illumination system according to claim 1, wherein the beam splitting/combining module further comprises a speckle expanding element disposed on a transmission path of the plurality of blue light beams to increase a divergence angle of the plurality of blue light beams.

9. The illumination system according to claim 8, wherein the speckle expanding element comprises a first speckle expanding part and a second speckle expanding part, wherein the first speckle expanding part is located on the transmission path of the plurality of blue light beams, the second speckle expanding part is located on a transmission path of the plurality of red light beams, and a divergence angle of the first speckle expanding part is greater than a divergence angle of the second speckle expanding part.

10. The illumination system according to claim 1, wherein the at least one beam splitting element is a polarization beam splitter.

11. A projection device comprising an illumination system, at least one light valve, and a projection lens, wherein:
   the illumination system is configured to provide an illumination light beam, and comprises a light emitting module, a light uniforming element, and a beam splitting/combining module, wherein:
      the light emitting module comprises a plurality of red light elements and a plurality of blue light elements, wherein the plurality of red light elements are configured to provide a plurality of red light beams, and the plurality of blue light elements are configured to provide a plurality of blue light beams
the light uniforming element has an optical axis and a light entrance surface; and
the beam splitting/combining module is disposed on a transmission path of at least one of the plurality of blue light beams, and is located between the light emitting module and the light uniforming element;
the at least one light valve is disposed on a transmission path of the illumination light beam, and is configured to convert the illumination light beam into an image light beam; and
the projection lens is disposed on a transmission path of the image light beam, and is configured to project the image light beam out of the projection device,
wherein the beam splitting/combining module comprises at least one beam splitting element and at least one reflective element, at least one light beam among the plurality of red light beams and the plurality of blue light beams is reflected by the at least one reflective element and the at least one beam splitting element, the plurality of red light beams and the plurality of blue light beams are transmitted to the light uniforming element in a direction parallel to the optical axis, and a speckle distribution on the light entrance surface is symmetrical with respect to the optical axis.

12. The projection device according to claim 11, wherein the beam splitting/combining module is located on transmission paths on which the plurality of red light beams and the plurality of blue light beams are transmitted in a collimated manner in the illumination system.

13. The projection device according to claim 11, wherein after the plurality of blue light beams are transmitted through the beam splitting/combining module, a speckle of the plurality of blue light beams overlaps with a speckle of at least a part of the plurality of red light beams.

14. The projection device according to claim 11, wherein the beam splitting/combining module further comprises a semi-reflective element, the at least one reflective element is one reflective element, the at least one beam splitting element is two beam splitting elements both configured to reflect blue light and allow red light to pass, a part of the plurality of blue light beams are reflected by the semi-reflective element and one of the beam splitting elements, and another part of the plurality of blue light beams pass through the semi-reflective element and are reflected by the reflective element and another one of the beam splitting elements.

15. The projection device according to claim 11, wherein a number of the plurality of red light elements is greater than or equal to a number of the plurality of blue light elements.

16. The projection device according to claim 11, wherein a number of the at least one reflective element and a number of the at least one beam splitting element are equal and both are at least one.

17. The projection device according to claim 11, wherein the light emitting module further comprises a plurality of green light elements configured to provide a plurality of green light beams, the plurality of green light beams are transmitted to the light uniforming element in a direction parallel to the optical axis, and a speckle distribution on the light entrance surface is symmetrical with respect to the optical axis.

18. The projection device according to claim 11, wherein the beam splitting/combining module further comprises a speckle expanding element disposed on a transmission path of the plurality of blue light beams to increase a divergence angle of the plurality of blue light beams.

19. The projection device according to claim 18, wherein the speckle expanding element comprises a first speckle expanding part and a second speckle expanding part, wherein the first speckle expanding part is located on the transmission path of the plurality of blue light beams, the second speckle expanding part is located on a transmission path of the plurality of red light beams, and a divergence angle of the first speckle expanding part is greater than a divergence angle of the second speckle expanding part.

20. The projection device according to claim 11, wherein the at least one beam splitting element is a polarization beam splitter.

* * * * *